United States Patent
Dooley

(10) Patent No.: US 7,062,283 B2
(45) Date of Patent: Jun. 13, 2006

(54) CELLULAR TELEPHONE SYSTEM WITH MULTIPLE CALL PATHS

(75) Inventor: Kevin Dooley, Toronto (CA)

(73) Assignee: Manageable Networks, Inc., Toronto (CA)

( * ) Notice: Subject to any disclaimer, the term of this patent is extended or adjusted under 35 U.S.C. 154(b) by 605 days.

(21) Appl. No.: 10/292,427

(22) Filed: Nov. 13, 2002

(65) Prior Publication Data

US 2004/0092276 A1     May 13, 2004

(51) Int. Cl.
    *H04B 15/00*     (2006.01)
    *H04B 7/005*     (2006.01)
    *H04B 7/01*     (2006.01)
    *H04B 7/015*     (2006.01)

(52) U.S. Cl. ............ 455/504; 455/3.03; 455/445; 455/422.1; 455/414.1; 455/500; 455/59; 455/72; 370/389; 370/342; 375/347

(58) Field of Classification Search ............... 455/504, 455/3.03, 59, 72, 127.5, 445, 414.1, 420, 455/422.1, 456.1, 500, 502, 503, 517, 522, 455/524; 370/389, 278, 335, 336, 342; 375/267, 375/347

See application file for complete search history.

(56) References Cited

U.S. PATENT DOCUMENTS

| | | | |
|---|---|---|---|
| 5,583,913 A * | 12/1996 | Taketsugu | 455/560 |
| 5,724,655 A | 3/1998 | Grube et al. | 455/419 |
| 5,796,722 A | 8/1998 | Kotzin et al. | 370/252 |
| 5,915,224 A | 6/1999 | Jonsson | 455/552 |
| 5,926,755 A | 7/1999 | Ghisler | 455/414 |
| 6,009,087 A | 12/1999 | Uchida et al. | 370/335 |
| 2002/0126664 A1 * | 9/2002 | Kiiski et al. | 370/389 |
| 2002/0141357 A1 * | 10/2002 | Park et al. | 370/328 |
| 2002/0154627 A1 * | 10/2002 | Abrol et al. | 370/352 |
| 2003/0022672 A1 * | 1/2003 | Yoshii et al. | 455/450 |
| 2003/0043773 A1 * | 3/2003 | Chang | 370/338 |
| 2004/0209618 A1 * | 10/2004 | Niemela et al. | 455/445 |

* cited by examiner

*Primary Examiner*—Edan Orgad
*Assistant Examiner*—Shaima Q. Aminzay
(74) *Attorney, Agent, or Firm*—Dimock Stratton LLP; Mark B. Eisen

(57) ABSTRACT

This invention relates to a method and device for improving the reliability and performance of cellular telephones. In particular, this invention provides a method of transmitting two signals which are substantially identical over two different cellular networks. The transmitted signals are received by a receiving device and synchronized and combined into one combined signal. The invention also discloses a cellular telephone system that is able to transmit two substantially identical signals over two different cellular networks which are received by a telephone device capable of synchronizing and combining the signals into one combined signal.

10 Claims, 3 Drawing Sheets

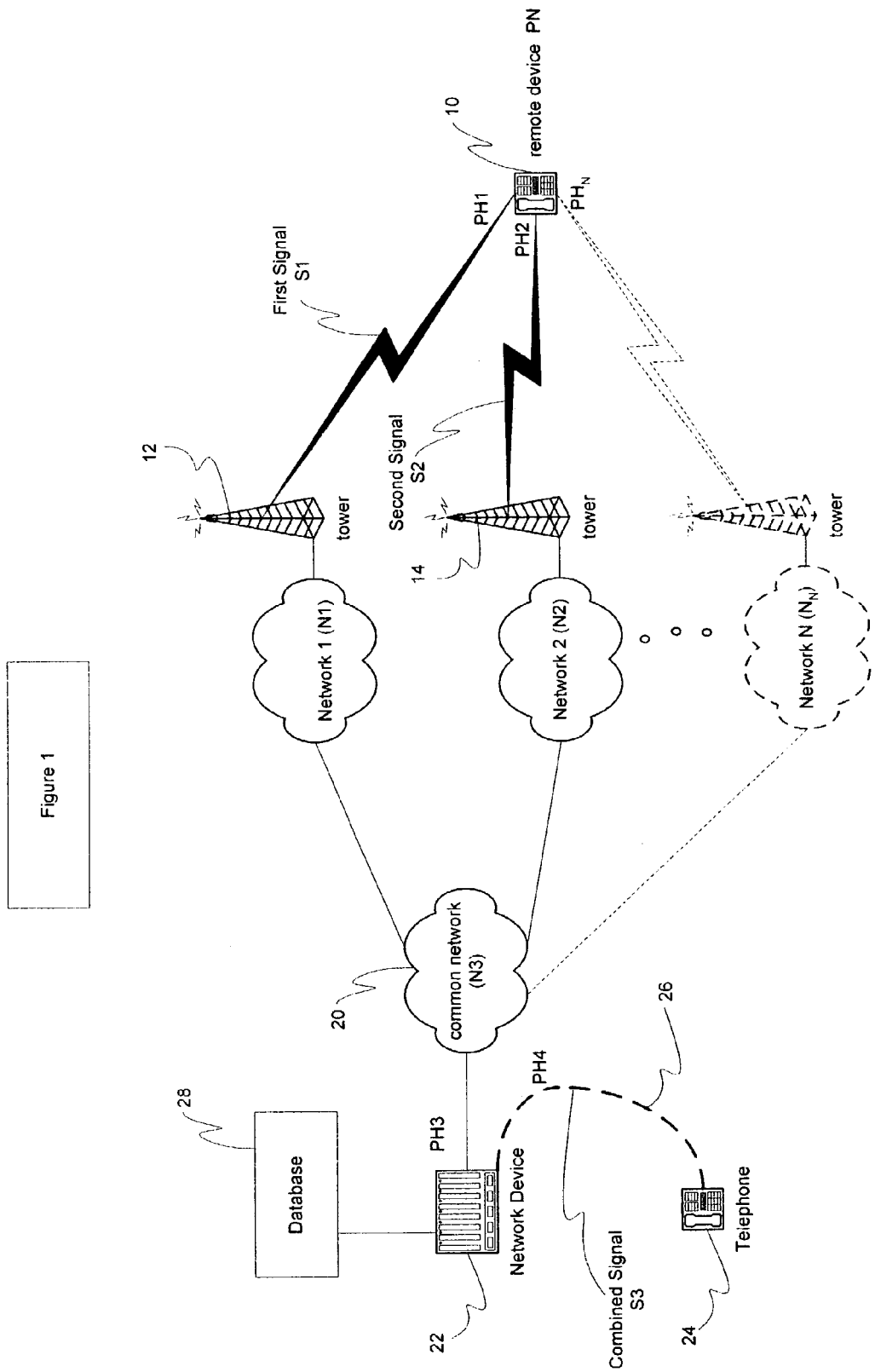

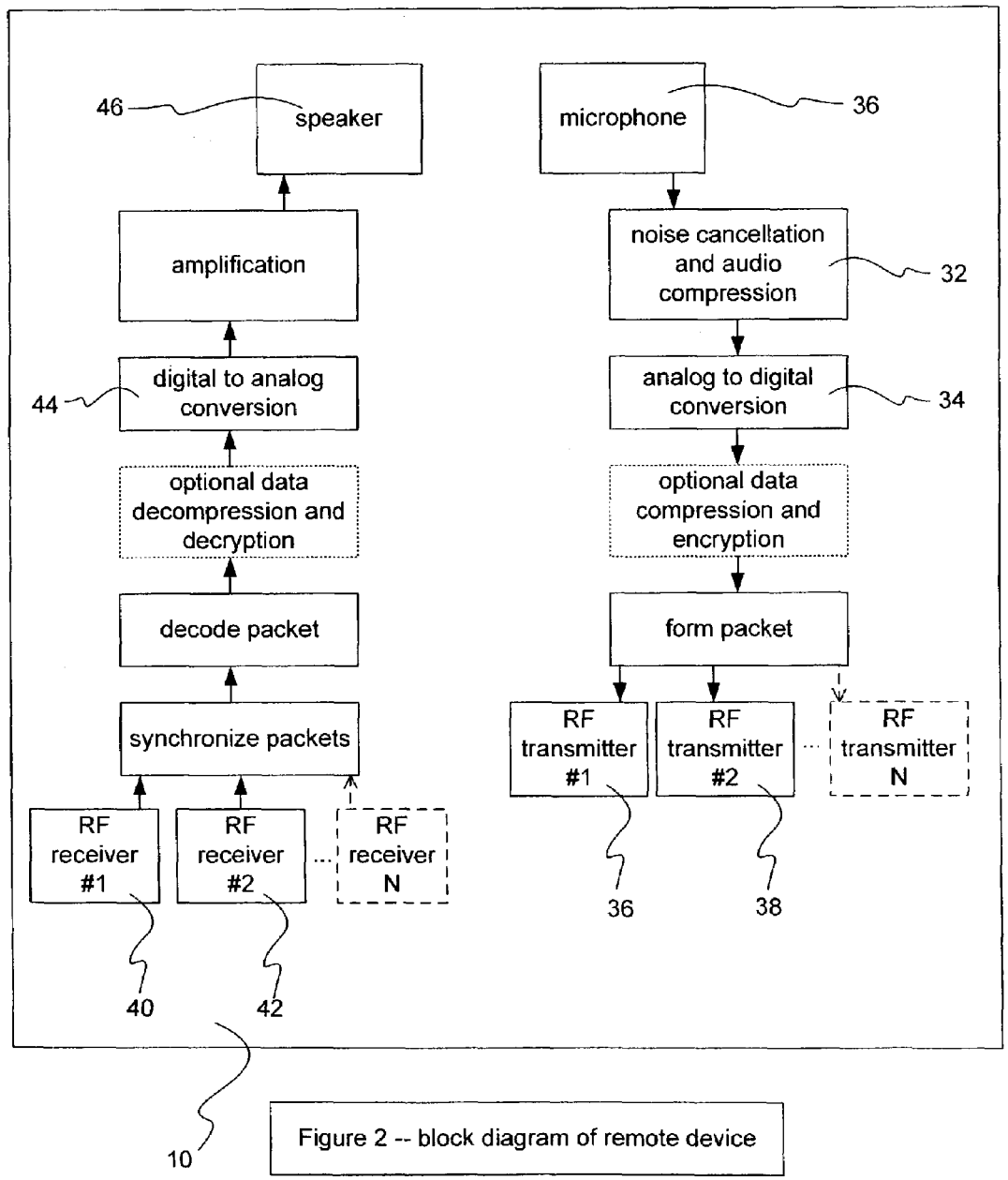
Figure 2 -- block diagram of remote device

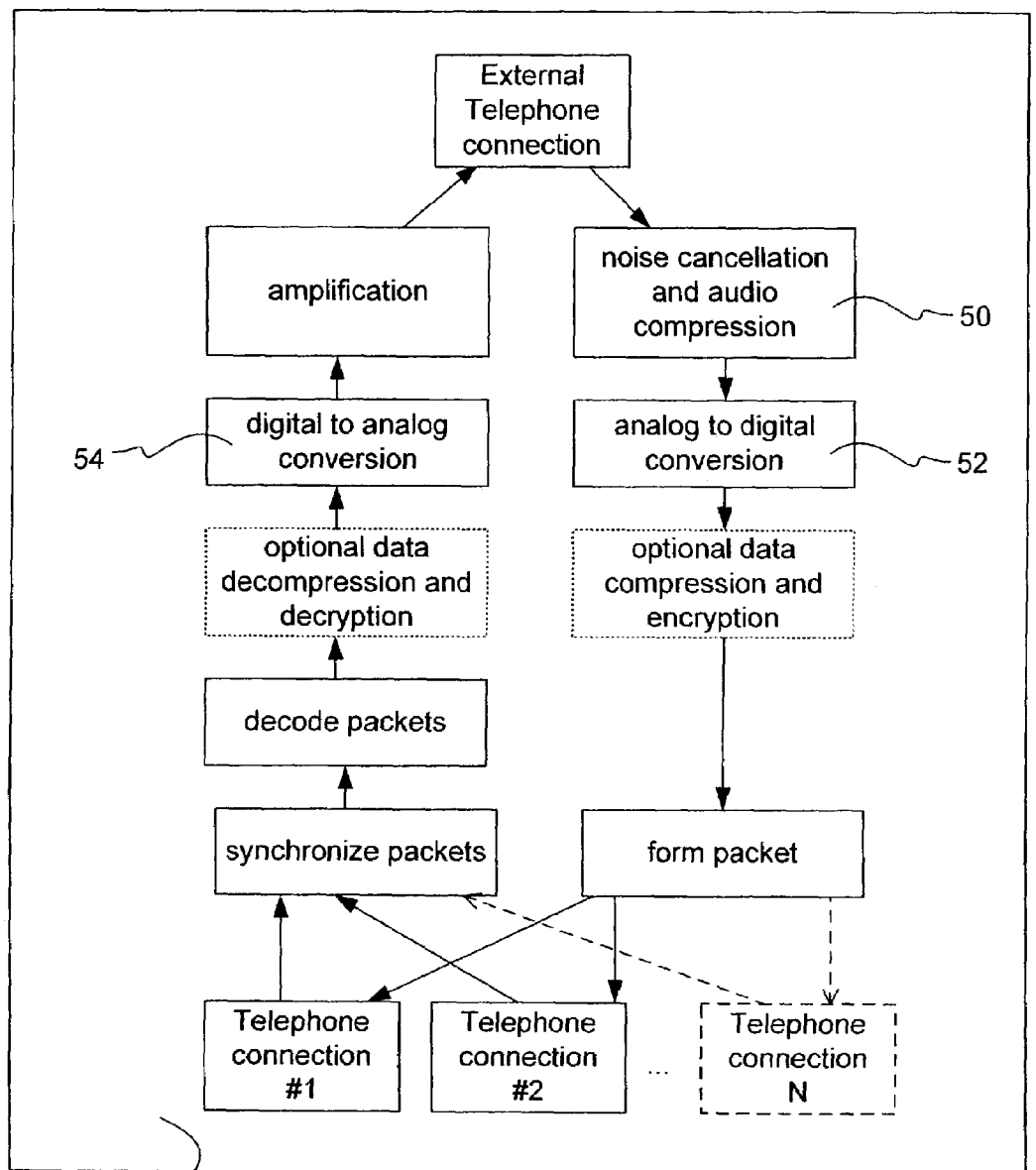
Figure 3 -- block diagram of network device

US 7,062,283 B2

CELLULAR TELEPHONE SYSTEM WITH MULTIPLE CALL PATHS

FIELD OF THE INVENTION

This invention relates to the field of mobile or cellular telephones. In particular, this invention relates to a device and method of improving the reliability and performance of cellular telephones.

BACKGROUND OF THE INVENTION

Cellular telephones offer the advantage of being able to communicate from mobile locations. However, existing cellular telephones suffer from the disadvantage of not being as reliable as "land-line" telephones. Cellular telephones tend to be more reliable in certain areas, such as downtown urban centers, rather than in other areas, such as outside of the downtown cores and in rural areas, where they are less reliable. In these less reliable areas, cellular telephone users generally experience an increased incidence of dropped calls. Dropped calls may result from a termination of the signal if there is interference or if a mobile user passes through a "dead zone" without coverage.

Dead zones generally result from inadequate coverage by cellular telephone providers. Present day cellular telephone technology is provided through the use of towers or nodes that are spaced at intervals. These towers or nodes have a high probability of receiving transmissions from cellular telephones within a certain radius of the tower or node. Outside of this radius, the probability of the tower receiving the transmission from the cellular telephone decreases.

However, due to various factors including constraints in technology causing degradation of signals and a concomitant reduction in signal range, location placement of the towers or nodes, and interference with signals, such as from hydro towers, cellular telephone calls are not presently 100% reliable. In fact, with the present technology, cellular telephone calls are often dropped, and the call terminated. The user must then remake the call to the other party or wait for the other party to call him or her. This is especially inconvenient in the case of the transmission or reception of a large amount of information, for example using a cellular telephone in conjunction with a personal digital assistant or a laptop computer.

Conventional approaches to this problem have been to increase the area of coverage through increasing the number of towers or nodes which transmit and receive signals. However, this involves a large degree of capital expenditure and results in an increased number of parallel cellular telephone networks.

It would accordingly be advantageous to provide a device and method of ensuring the reliability of cellular telephone calls to ensure that calls are maintained and not dropped.

The present invention thus provides a method of transmitting and receiving telephone signals comprising transmitting a first signal from a first device over a first cellular network, simultaneously transmitting a second signal substantially identical to the first signal over a second cellular network, receiving at least the first and second signals at a second device, synchronizing at least the first and second signals into one combined signal; and combining at least the first and second signals into one combined signal.

The invention further comprising the steps of determining at least two identifying numbers representing the second device prior to transmission over the two cellular networks; transmitting the combined signal from the second device to a third device; checking for the termination of transmission of either the first or second signal and reestablishing connection for the terminated signal; simultaneously transmitting a third signal substantially identical to the first and second signals over a third cellular network wherein the first, second and third signals are synchronized and combined into one combined signal; and simultaneously transmitting an nth signal substantially identical to the first signal over an nth cellular network wherein the first through nth signals are synchronized and combined into one combined signal.

The invention also provides a cellular telephone system comprising a first telephone device adapted to simultaneously transmit a first signal over a first cellular network and at least a substantially identical second signal over a second cellular network, and a second telephone device adapted to receive at least the first and second signals and to synchronize and combine at least the first and second signals into one combined signal.

The invention further provides a processing device to determine at least two identifying numbers representing the second telephone device prior to transmission over cellular networks.

The invention also provides a third telephone device adapted to receive the combined signal from the second telephone device.

The invention further comprising a check for the termination of transmission of either the first or second signal and re-establishes connection for the terminated signal.

The invention also providing the first telephone device additionally adapted to simultaneously transmit a third signal substantially identical to the first and second signals over a third cellular network and the second telephone device additionally adapted to receive the third signal and to synchronize and combine the first, second and third signals into one combined signal.

The invention further providing the first telephone device additionally adapted to simultaneously transmit an nth signal substantially identical to the first signal over an nth cellular network and the second telephone device additionally adapted to receive the nth signal nd to synchronize and combine the first through nth signals into one combined signal.

BRIEF DESCRIPTION OF THE DRAWINGS

The present invention will be described in greater detail with reference to the accompanying drawings, FIG. 1 is a schematic diagram of a the present invention;

FIG. 2 is a block diagram of the remote device of FIG. 1; and

FIG. 3 is a block diagram of the network device of FIG. 1.

In the drawings, preferred embodiments of the invention are illustrated by way of example. Other further advantages and features of the invention will be apparent to those skilled in the art from the following detailed description thereof and the accompanying drawings.

It is expressly understood that the description and drawings are illustrative of certain embodiments of the invention, but the invention itself is defined by the accompanying claims.

DETAILED DESCRIPTION OF THE PREFERRED EMBODIMENTS

As shown in FIG. 1, the preferred embodiment of this invention comprises a remote device 10 adapted to transmit and receive signals over at least two cellular telephone networks. The remote device 10 is able to send or receive a first signal (S1) to or from a conventional cellular telephone node or tower 12 of a first cellular telephone network (N1). At the same time, the remote device 10 is capable of sending or receiving a second signal (S2) to or from a second independent cellular telephone node or tower 14 from a second cellular telephone network (N2). It can be appreciated that, in the present invention, third, fourth . . . "n" transmissions can be sent or received over third, fourth . . . n cellular networks.

In the case of a call from remote device 10 to a landline telephone 24 as shown in FIG. 1, the first signal (S1) is transmitted to tower 12 and network (N1) and then transmitted to a common network (N3) 20 and network device 22. Similarly, the second signal (S2) is transmitted to tower 14 and network (N2) and then transmitted to common network (N3) 20 and network device 22. The network device 22 processes and synchronizes the separate signals (S1 and S2) into a combined signal (S3). Preferably, this singular, combined signal (S3) is of a higher quality with a higher signal to noise ratio than either of the individually transmitted signals (S1 and S2). The combined signal (S3) is then transmitted to telephone 24.

Similarly, in the case of a call from landline telephone 24 to remote device 10, a signal (not shown) is transmitted from the landline telephone 24 to network device 22. The network device 22 accesses database 28 for the two (or more) cellular phone members assigned to remote device 10 and then simultaneously transmits signals over cellular networks (N1 and N2) to remote device 10. Remote device 10 then processes and synchronizes the separate signals into a combined signal. Each of the signals (S1 or S2) that are transmitted or received, comprise packets of information or data which are continuously transferred over the networks. Each data packet contains unique identifying elements. The packet contains a time stamp or sequence number that uniquely identifies the packet order and timing. The packet also contains a checksum to identify damaged or corrupted packets.

It would also be preferable to include a field in the packet header that would identify additional options such as payload encryption and compression. This field could also be used to distinguish control data that is used for call set-up and authentication from encapsulated audio data.

The packet format may be illustrated as follows:

| start delimiter | timestamp | packet length | options | data payload | checksum |
|---|---|---|---|---|---|
| 1 byte | 2 bytes | 1 byte | 1 byte | N bytes | 4 bytes |

The start delimiter is a string of bytes selected so that they will be unlikely to be confused with noise. In many common protocols known to those skilled in the art, the start delimiter is chosen to be a pattern such as "10101011" (hex "AB", decimal "171"). The sequence includes three sequences of "10" to identify that the packet will follow. This is followed by the sequence "11" to indicate the byte boundary. In this way, even if the first few bits are not seen by the receiving device, then it is still possible to identify not only the start of the packet, but also the location of the byte boundary. The first few bits may not be seen due to a slow start-up possibly caused by noise cancellation or audio compression equipment in the cellular network. It may be necessary in some networks to use 2 or more bytes for the start delimiter.

The timestamp is used to ensure synchronization between the two data streams. The timestamp may be reflective of real time or could be implemented simply as a counter as it need not actually represent real time. Since the timestamp is 2 bytes long, this field can count from 0 to 65535 before repeating.

With existing cellular networks, available bandwidths are in the range of 9600 bits per second. If packets are 50 bytes long, then the system will send approximately 24 packets per second along both paths. Consequently, a stream of 65535 packets corresponds to roughly 45 minutes of data. This is sufficiently long to ensure that there is no ambiguity in the counters caused by a packet being delayed by one full cycle.

The packet length field is a single 8-bit byte. This allows packets to be up to 255 bytes long. In a network that supports 9600 bits per second, this means that the longest packet can support approximately 0.2 seconds of voice data. This is sufficient as it is preferable that the packets are kept short, since damage to any bit will require discarding the entire packet. Second, the longer the packets, the greater the latency. Existing cellular telephone networks generally suffer from latency of this order of magnitude, and longer packets may make this latency problem worse.

Packet length should be measured to include the header and checksum, excluding the start delimiter. The start delimiter is excluded because it is possible to lose the start of the packet due to noise cancellation and audio compression in the cellular network yet for the data still to be successfully transferred.

The options field contains 8 bits that can be used to specify different information about the data stream. This information may include the following:

bit 1—set to 1 if data, 0 if control bit 2—set to 1 if payload compression, 0 if no compression bit 3—set to 1 if payload encryption, 0 if no encryption The remaining 5 bits can be used for other protocol enhancements such as specifying different types of data in the payload, Quality of Service options, call routing options or other protocol enhancements that may facilitate future functional developments.

The checksum may be a conventional 32-bit cyclic redundancy checksum which is well known in the art. There are well-optimized algorithms, well known to those skilled in the art, which can calculate the checksum. The checksum is preferably calculated on the entire packet including the header but excluding the start delimiter.

The data payload contains the voice, fax or data information that is being conveyed between the remote device 10 and the network device 22. The length of the payload field is left unspecified so that it can be negotiated when the call is initiated. If both cellular networks can support higher data bandwidths, then it may be appropriate to use a longer packet size. If there is considerable noise on either path, then a shorter packet may be required. The data payload can be between 0 to 247 bytes long.

An advantage of this communication protocol is that it is not necessary to include source or destination addresses as both links in this system are point-to-point connections. There is only one possible source and only one possible destination for each packet.

In use, the present invention utilizes the time stamp or sequence number from the header segment of each packet to keep the two data streams synchronized with one another. Both data streams contain identical data. Each time the system encodes a segment of audio data at either the remote device 10 or network device 22, identical data, in the form of packets, is sent along both paths.

When a particular data segment is received on one path, this packet is held for a short time either until the same packet is received from the other path or for a brief timeout period. The packets from both paths are then decoded and combined into a resulting audio signal. If either packet is dropped in the network, then the receiving device (the remote device 10 or network device 22) will wait a brief timeout period before ignoring the missing packet and processing only the packet that is received.

If both packets are dropped, then a corresponding period of silence is injected into the combined audio stream. As soon as valid data appears on either path again, the system will resume decoding.

A sequence/timing indicator in the packet header determines successful delivery. Data integrity is verified by a packet checksum. If either of these tests fails, the packet is not retransmitted. Instead, the apparatus uses the corresponding packet received on the other path. Consequently, there is no need for any acknowledgements in the data stream.

There are several potential mechanisms for detecting a dropped call in this invention. The first is that either the remote device 10 or the network device 22 may receive a call disconnect signal from one of the networks for the call along this path. The second method uses the signal strength of the RF carrier signal of both networks which may be measured directly by the remote device 10. If the signal strength for either of the two networks drops below a defined minimum level for a defined period of time, the call may be assumed to have been dropped. A third method is that either device 10 or network device 22 which has not received any data packets along a path may send a control packet through a path to the other device requesting a response along the same path. If no response is received within a specified time period, then the device 10 or network device 22 may disconnect the call along this path.

When one of the paths drops a call, the present invention allows for reestablishing the connection on the cellular telephone network that was dropped. It is preferable that the remote device 10 initiate re-establishment of a broken call as the remote device 10 is able to directly measure the signal strength for the cellular network.

When the remote device 10 detects that the call has dropped along one of the paths, it proceeds with a hang-up to terminate the session fully on both networks N1, N2. The remote device 10 waits for a designated amount of time to ensure that the call has cleared the network device 22. A preferred default time period for this is approximately one minute. A shorter time period has the potential to cause "flapping" problems with the link. Flapping refers to the situation where the signal quality on a network is severely degraded so that each time the connection is re-established, it is dropped again after a short period of time. This results in increased resource utilization in the network and on the devices. However, in the present invention, unlike in many other network technologies, the presence of a flapping problem in one network will not disrupt normal communications through the other. A significantly longer time period would decrease the likelihood that the call is still in progress.

After the default time period has elapsed, the remote device 10 measures the signal strength along the dropped path. The remote device 10 also verifies that the call is still in progress along the remaining path. The remote device 10 automatically makes a call to the network device 22 along the dropped path. Once connected, the remote device 10 sends a packet to authenticate itself with the network device 22. Since there is only one connection to that device, the network device 22 can determine which path this new connection is re-establishing.

The call re-establishment process includes the ability to negotiate new timer and packet size parameters. The remote device 10 may request new values along this path because of a poor cellular signal. If this is the case, then the new values must be sent along the other path as well by means of a control packet containing the new values. Both devices 10, 22 must acknowledge these new parameters along both paths before they can be adopted. A soon as they are adopted, however, they are adopted for both paths and will be immediately put into use.

For calls originating with the remote device 10, the user dials the telephone number of the landline telephone destination 24. The remote device 10 dials and sends signals simultaneously on both cellular networks (N1 and N2) to connect to the network device 22.

As each path connects, the network device 22 sends a single packet to the remote device 10 with the control/data bit set to control (0). The remote device 10 responds to this packet by sending a single packet with the control/data bit set to control (0) to the network device 22. The payload of this packet contains a unique identification number for the remote device 10 for authentication purposes. It may preferably also contain a set of preferred settings for timers and packet size. This is done independently and asynchronously on both paths (N1 and N2).

If the network device 22 does not recognize the unique identification number, it may elect to drop both calls.

If the network device 22 does not support the preferred setting for timers and packet size, it can negotiate these values by sending a packet to the remote device 10 with its preferred values. If it does support the values, then it sends a packet with the same values that were requested by the remote device 10.

If any of the values have been changed, the remote device 10 may either again negotiate other values, or it may confirm the requested values by sending a packet with the same values that were requested. In this way the two devices 10 and 22 may negotiate a common set of values. The timers and packet sizes must be the same on both paths in order to synchronize the signals.

If either path fails to connect, the call proceeds on the other path. The failed path is treated as a dropped call. As indicated above, a timer process is initiated that will attempt to re-establish the dropped call path.

If more thorough authentication is required, or if encryption is enabled, then these processes can also be negotiated.

As soon as the authentication and parameter negotiation processes are complete, the remote device 10 sends a control packet (0) along both paths that contains the telephone number that was entered by the user. The network device 22 dials this number and connects the call to the network telephone destination 24. The network device 22 samples audio data coming from this line 26 and processes the data into packets, which are sent along both paths to the remote device 10. The network device 22 also decodes incoming packet data from the remote device 10 and sends this as an audio signal to the telephone 24.

For calls that originate from the telephone 24, the network device 22 receives a telephone call on a particular number PN or identifying code that uniquely represents the remote device 10. The network device 22 cross-references the particular number PN in its database 28 to locate the two cellular numbers assigned to the remote device 10. This information database may also contain default sets of timing and packet size parameters for the device 10. This information can be used to facilitate a faster call set-up.

The network device 22 dials two outbound telephone numbers PH1 and PH2 over the two cellular paths (N1 and N2) to the remote device 10.

When the remote device 10 receives the incoming calls on each path, it separately authenticates both calls asynchronously. The remote device 10 sends a single packet with the control/data bit set to control (0) separately on each path.

The network device 22 responds to these packets by sending a single packet with the control/data bit set to control (0) on each path. The payload of this packet contains a unique identification number for the remote device for authentication purposes. It also preferably contains a set of preferred settings for timers and packet size. This is done independently and asynchronously on both paths.

If the remote device 10 does not recognize this unique identification number on either path, then it may elect to drop both calls.

At this point the two devices 10, 22 negotiate timer values and packet size values as described above.

The two devices 10, 22 may perform additional authentication or negotiate encryption at this point.

Once this call set-up procedure has completed successfully, the two devices 10, 22 begin exchanging audio data as described above. There is no need in this case to transmit an external number to be dialed because the external call has already been connected to the network device 22.

Although the present invention is able to terminate calls simply by dropping the calls along either or both paths (N1 or N2), it is preferable to explicitly negotiate a disconnection.

If the network device 22 detects that it has lost connection with the external telephone 24, the network device 22 may signal a disconnection by sending a control packet along both paths (N1 and N2). The payload of this packet will contain a call termination code.

The remote device 10 will then respond to this call termination code with a termination acknowledgement code along both paths (N1 and N2). Both the remote device 10 and the network device 22 will disconnect from both paths (N1 and N2).

If the call termination signal and acknowledgement are not received either by the network device 22 or the remote device 10 along both paths, then this is interpreted as a signal to drop one of the paths. This may be as a result of signal problems along one path.

If either the network device 22 or the remote device 10 sends a call termination signal along one path but does not receive an acknowledgement within the required timeout period, then the signal is preferably sent again. If there is still no acknowledgement after the second call termination signal, then the call is dropped.

If the call is disconnected from remote device 10 then the remote device 10 will send a packet with the termination signal along both paths. The network device 22 will acknowledge this signal along both paths (N1 and N2).

If the remote device 10 does not receive the termination acknowledgement code along both paths, then it will repeat the termination message along both paths (N1 and N2).

If there is still no acknowledgement after the second call termination signal, then the call is dropped.

As shown in FIG. 2, audio signals from the microphone 30 of the remote device 10 are passed to a conventional noise cancellation and audio compression circuit 32. The output of this circuit is passed to a conventional analog to digital conversion circuit 34.

The resulting digital signal may preferably be encrypted or compressed using conventional encryption and data compression algorithms known to those skilled in the art.

The resulting data is then processed into a packet format. Cellular RF transmitter 36 then transmits a copy of this packet over network 1 (N1) and simultaneously cellular RF transmitter 38 transmits an identical copy of this packet over network 2 (N2).

The return path is similar. Incoming packets from each cellular RF receiver 40, 42 are first synchronized using data included in the headers of each packet. This may involve buffering of either or both data streams.

Once the packets are synchronized, which may be according to the conventional algorithms well known to those skilled in the art, they are decoded.

If data compression or encryption is present, the data is then uncompressed or unencrypted or both. The resulting data is a digital audio signal. This signal is converted from digital to analog using a conventional digital to analog conversion circuit 44 and amplified and played through the speaker 46.

A block diagram of the network device 22 is shown in FIG. 3. Audio signals from the incoming telephone circuit for the external call are passed to a conventional noise cancellation and audio compression circuit 50. The output of this circuit is passed to a conventional analog to digital conversion circuit 52.

The resulting digital signal may preferably be encrypted or compressed using conventional encryption and data compression algorithms.

The resulting data is then processed into a packet format. As described above, the network device 22 transmits identical copies of this packet simultaneously to the remote device 10.

The return path is similar. Incoming packets from each telephone call to the remote device are first synchronized using data included in the headers of each packet. This may involve buffering of either or both data streams.

Once the packets are synchronized, which may be according to conventional algorithms well known to those skilled in the art, they are decoded.

If data compression or encryption is present, the data is then uncompressed or unencrypted or both. The resulting data is a digital audio signal. This signal is converted from digital to analog using a conventional digital to analog conversion circuit 54 and amplified, and played through a speaker 56.

The present invention offers the advantage that by simultaneously sending signals over separate networks and then by combining these signals, the quality of the signal received is often better than that of either of the individual signals transmitted over the individual network. At worst, the singular, combined received signal is the same quality as the quality of the better of the two or more separate signals transmitted over the networks.

Another advantage of the present invention is that there is a built-in redundancy in this system which increases the reliability of cellular telephone calls. With existing cellular phone technology, calls are dropped if there is no coverage in an area by a cellular network. In this system, if there is no coverage in an area by the first network, then the first signal will be dropped. If the area is covered by the second network, then the second signal will continue to be transmitted and received. This system increases the reliability and integrity of transmission. If P1 is the probability of dropping the signal from the first network and P2 is the probability of dropping the signal in the second network, then the probability of dropping a packet in the invention is P1*P2. It can be appreciated that if third, fourth . . . n networks are used, then the probability of dropping the connection decreases dramatically.

Although various preferred embodiments of the present invention have been described herein in detail, it will be appreciated by those skilled in the art, that variations may be made thereto without departing from the spirit of the invention or the scope of the invention as set out in the appended claims.

I claim:

1. A method of transmitting and receiving telephone signals comprising:
   determining at least two identifying numbers representing a second device prior to transmission over two cellular networks,
   transmitting a first signal from a first device over a first cellular network,
   simultaneously transmitting a second signal substantially identical to the first signal over a second cellular network,
   receiving at least the first and second signals at the second device,
   synchronizing at least the first and second signals into one combined signal; and
   combining at least the first and second signals into one combined signal.

2. The method of claim 1 additionally comprising the step of transmitting the combined signal from the second device to a third device.

3. The method of claim 2 additionally comprising the step of checking for the termination of transmission of either the first or second signal and re-establishing connection for the terminated signal.

4. The method of claim 1 including the step of simultaneously transmitting a third signal substantially identical to the first and second signals over a third cellular network wherein the first, second and third signals are synchronized and combined into one combined signal.

5. The method of claim 1 including the step of simultaneously transmitting an nth signal substantially identical to the first signal over an nth cellular network wherein the first through nth signals are synchronized and combined into one combined signal.

6. A cellular telephone system comprising
   a first telephone device adapted to simultaneously transmit a first signal over a first cellular network and at least a substantially identical second signal over a second cellular network, and
   a second telephone device adapted to receive at least the first and second signals and to synchronize and combine at least the first and second signals into one combined signal, and
   a processing device to determine at least two identifying numbers representing the second telephone device prior to transmission over the two cellular networks.

7. The device of claim 6 additionally comprising a third telephone device adapted to receive the combined signal from the second telephone device.

8. The device of claim 7 wherein the device cheeks for the termination of transmission of either the first or second signal and re-establishes connection for the terminated signal.

9. The device of claim 6 wherein the first telephone device is additionally adapted to simultaneously transmit a third signal substantially identical to the first and second signals over a third cellular network and the second telephone device is additionally adapted to receive the third signal and to synchronize and combine the first, second and third signals into one combined signal.

10. The device of claim 6 wherein the first telephone device is additionally adapted to simultaneously transmit an nth signal substantially identical to the first signal over an nth cellular network and the second telephone device is additionally adapted to receive the nth signal and to synchronize and combine the first through nth signals into one combined signal.

* * * * *